US012160918B2

(12) United States Patent
Aalto et al.

(10) Patent No.: US 12,160,918 B2
(45) Date of Patent: Dec. 3, 2024

(54) MONITORING MOBILE DEVICE

(71) Applicant: Nokia Solutions and Networks Oy, Espoo (FI)

(72) Inventors: Mika Maurits Aalto, Espoo (FI); Ari Laukkanen, Espoo (FI); Jari Juhani Hyytiäinen, Kerava (FI); Niklas Peter Jakob Wik, Lepplax (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 728 days.

(21) Appl. No.: 17/284,619

(22) PCT Filed: Oct. 31, 2018

(86) PCT No.: PCT/FI2018/050793
§ 371 (c)(1),
(2) Date: Apr. 12, 2021

(87) PCT Pub. No.: WO2020/089507
PCT Pub. Date: May 7, 2020

(65) Prior Publication Data
US 2021/0345435 A1 Nov. 4, 2021

(51) Int. Cl.
*H04W 76/19* (2018.01)
*H04W 24/08* (2009.01)
(Continued)

(52) U.S. Cl.
CPC .......... *H04W 76/19* (2018.02); *H04W 24/08* (2013.01); *H04W 60/04* (2013.01); *H04W 60/06* (2013.01); *H04W 76/30* (2018.02)

(58) Field of Classification Search
CPC ..... H04W 76/19; H04W 24/08; H04W 60/04; H04W 60/06; H04W 76/30; H04W 60/00;
(Continued)

(56) References Cited

U.S. PATENT DOCUMENTS 9,924,491 B1 * 3/2018 Dreiling ................ H04W 68/02
2011/0170404 A1 7/2011 Nordin
(Continued)

FOREIGN PATENT DOCUMENTS

EP 3163935 A1 5/2017
EP 3346753 A1 7/2018
(Continued)

OTHER PUBLICATIONS

Extended European Search Report received for corresponding European Patent Application No. 18938716.0, dated May 13, 2022, 14 pages.
(Continued)

Primary Examiner — Marisol Figueroa
(74) Attorney, Agent, or Firm — ALSTON & BIRD LLP

(57) ABSTRACT

According to an example aspect of an embodiment, there is provided that an online server determines mobile device to be monitored based on at least partially an Internet Protocol, IP, address of the mobile device. The online server functionality executes an IP-based two-way communications protocol with the mobile device by transmitting one or more request messages. The online server functionality determines one or more lost responses from the mobile device to the one or more request messages and causes generating a request to another entity for triggering the another entity by one or more recovery methods for the mobile device.

20 Claims, 7 Drawing Sheets

(51) Int. Cl.
*H04W 60/04* (2009.01)
*H04W 60/06* (2009.01)
*H04W 76/30* (2018.01)

(58) Field of Classification Search
CPC .... H04W 8/30; H04W 24/04; H04L 41/0894; H04L 41/40; H04L 43/065; H04L 43/0817; H04L 69/40
See application file for complete search history.

(56) References Cited

U.S. PATENT DOCUMENTS

| | | | |
|---|---|---|---|
| 2013/0295918 | A1 | 11/2013 | Andersson |
| 2014/0301181 | A1 | 10/2014 | Suryavanshi et al. |
| 2014/0376360 | A1 | 12/2014 | Lisak et al. |
| 2016/0021697 | A1 | 1/2016 | Vargantwar et al. |
| 2016/0286385 | A1 | 9/2016 | Ryu et al. |
| 2016/0337841 | A1* | 11/2016 | Won .................. H04W 24/10 |
| 2019/0387451 | A1* | 12/2019 | Kucera .............. H04L 65/1023 |

FOREIGN PATENT DOCUMENTS

| | | |
|---|---|---|
| WO | 2013/189311 A1 | 12/2013 |
| WO | 2017/196246 A2 | 11/2017 |
| WO | 2018/125686 A2 | 7/2018 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401, V13.4.0, Sep. 2015, pp. 1-334.

"3rd Generation Partnership Project; Technical Specification Group Services and System Aspects;General Packet Radio Service (GPRS) enhancements for Evolved Universal Terrestrial Radio Access Network (E-UTRAN) access (Release 15)", 3GPP TS 23.401, V15.3.0, Mar. 2018, pp. 405.

"3rd Generation Partnership Project; Technical Specification Group Services and System Aspects;System Architecture for the 5G System; Stage 2(Release 15)", 3GPP TS 23.501, V15.1.0, Mar. 2018, pp. 1-201.

"3rd Generation Partnership Project; Technical Specification Group Services and System Aspects;Architecture enhancements to facilitate communicationswith packet data networks and applications (Release 15)", 3GPP TS 23.682, V15.4.0, pp. 1-124.

"Managing LTE Core Network Signaling Traffic", Nokia, Retrieved on Apr. 12, 2021, Webpage available at : https://www.nokia.com/blog/managing-lte-core-network-signaling-traffic/.

"Plane (in networking)", WhatIs, Retrieved on Apr. 12, 2021, Webpage available at : https://whatis.techtarget.com/definition/plane-in-networking.

International Search Report and Written Opinion received for corresponding Patent Cooperation Treaty Application No. PCT/FI2018/050793, dated Feb. 8, 2019, 17 pages.

"3rd Generation Partnership Project; Technical Specification Group Services and System Aspects;Architecture enhancements to facilitate communicationswith packet data networks and applications (Release 16)The present", 3GPP TS 23.682, V16.0.0, Sep. 2018, pp. 1-126.

Said et al., "Software Defined Networking (SDN) for reliableuser connectivity in 5G Networks", IEEE Conference on Network Softwarization (NetSoft), Jul. 3-7, 2017, 5 pages.

Office Action for European Application No. 18938716.0 dated Jun. 14, 2024, 10 pages.

* cited by examiner

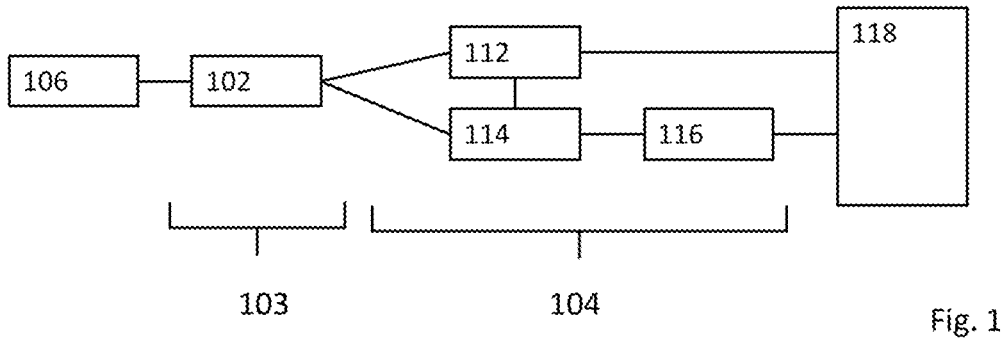

Fig. 1

202 determining, by an online server functionality a mobile device to be monitored based on at least partially an Internet Protocol, IP, address of the mobile device 204 executing, by the online server functionality, an IP- based two-way communications protocol with the mobile device by transmitting one or more request messages 206 executing, by the online server functionality, an IP- based two-way communications protocol with the mobile device by transmitting one or more request messages done 208 causing, by the online server functionality, to generate a request to another entity for triggering the another entity to select one or more recovery methods for the mobile device

Fig. 2

MONITORING MOBILE DEVICE

RELATED APPLICATION

This application claims priority to PCT Application No. PCT/FI2018/050793, filed on Oct. 31, 2018, which is incorporated herein by reference in its entirety.

FIELD

The present invention relates to monitoring a mobile device.

BACKGROUND

Wireless modem devices are used to provide data transfer via mobile communications networks to other devices. These other devices may be used in industrial applications that require that connections are available. If the wireless modem device has a failure for any reason, e.g. physically broken hardware and/or software error, it becomes a single point of failure which affects the whole system whereby the devices and industrial applications that rely on the data transfer provided by wireless modem device become affected.

A problem for the wireless modem device is when a modem module inside the wireless modem device stops processing data packets properly but from the mobile communications network point of view the wireless modem device is operating correctly. In such a situation, the status of the wireless modem can appear to be ok to the mobile communications network. However, when uplink data packets don't go through, the applications relying on the data transfer via the mobile communications network become affected.

SUMMARY OF THE INVENTION

The invention is defined by the features of the independent claims. Some specific embodiments are defined in the dependent claims.

According to a first aspect in accordance with at least some embodiments, there is provided a method comprising:
  determining, by an online server functionality, a mobile device to be monitored based on at least partially an Internet Protocol, IP, address of the mobile device;
  executing, by the online server functionality, an IP-based two-way communications protocol with the mobile device by transmitting one or more request messages;
  determining, by the online server functionality, one or more lost responses from the mobile device to the one or more request messages; and
  causing, by the online server functionality, to generate a request to another entity for triggering the another entity to select one or more recovery methods for the mobile device.

According to a second aspect in accordance with at least some embodiments, there is provided a method comprising:
  receiving, by a management function, a request to select one or more recovery methods for a mobile device addressable in a communications network by an Internet Protocol, IP, address;
  applying, by the management function, at least one recovery method to the mobile device; and
  after the recovery method has been applied, in response to determining a recovery of the mobile device,
  transmitting, by the management function, information indicating the recovery of the mobile device to the online server functionality.

According to a third aspect in accordance with at least some embodiments, there is provided an apparatus comprising means for performing:
  determining, by an online server functionality, a mobile device to be monitored based on at least partially an Internet Protocol, IP, address of the mobile device;
  executing, by the online server functionality, an IP-based two-way communications protocol with the mobile device by transmitting one or more request messages;
  determining, by the online server functionality, one or more lost responses from the mobile device to the one or more request messages; and
  causing, by the online server functionality, to generate a request to another entity for triggering the another entity to select one or more recovery methods for the mobile device.

According to a fourth aspect in accordance with at least some embodiments, there is provided an apparatus comprising means for performing:
  receiving, by a management function, a request to select one or more recovery methods for a mobile device addressable in a communications network by an Internet Protocol, IP, address;
  applying, by the management function, at least one recovery method to the mobile device; and
  after the recovery method has been applied, in response to determining a recovery of the mobile device,
  transmitting, by the management function, information indicating the recovery of the mobile device to the online server functionality.

According to a fifth aspect in accordance with at least some embodiments there is provided a non-transitory computer readable medium having stored thereon a set of computer readable instructions that, when executed by at least one processor, cause an apparatus to at least:
  determining, by an online server functionality, a mobile device to be monitored based on at least partially an Internet Protocol, IP, address of the mobile device;
  executing, by the online server functionality, an IP-based two-way communications protocol with the mobile device by transmitting one or more request messages;
  determining, by the online server functionality, one or more lost responses from the mobile device to the one or more request messages; and
  causing, by the online server functionality, to generate a request to another entity for triggering the another entity to select one or more recovery methods for the mobile device.

According to a sixth aspect in accordance with at least some embodiments, there is provided a non-transitory computer readable medium having stored thereon a set of computer readable instructions that, when executed by at least one processor, cause an apparatus to at least:
  receiving, by a management function, a request to select one or more recovery methods for a mobile device addressable in a communications network by an Internet Protocol, IP, address;
  applying, by the management function, at least one recovery method to the mobile device; and
  after the recovery method has been applied, in response to determining a recovery of the mobile device,
  transmitting, by the management function, information indicating the recovery of the mobile device to the online server functionality.

According to a seventh aspect in accordance with at least some embodiments, there is provided a computer program comprising instructions for causing an apparatus to perform at least the following:
- determining, by an online server functionality, a mobile device to be monitored based on at least partially an Internet Protocol, IP, address of the mobile device;
- executing, by the online server functionality, an IP-based two-way communications protocol with the mobile device by transmitting one or more request messages;
- determining, by the online server functionality, one or more lost responses from the mobile device to the one or more request messages; and
- causing, by the online server functionality, to generate a request to another entity for triggering the another entity to select one or more recovery methods for the mobile device.

According to an eighth aspect in accordance with at least some embodiments, there is provided a computer program comprising instructions for causing an apparatus to perform at least the following:
- receiving, by a management function, a request to select one or more recovery methods for a mobile device addressable in a communications network by an Internet Protocol, IP, address;
- applying, by the management function, at least one recovery method to the mobile device; and
- after the recovery method has been applied, in response to determining a recovery of the mobile device,
- transmitting, by the management function, information indicating the recovery of the mobile device to the online server functionality.

According to a ninth aspect in accordance with at least some embodiments, there is provided a system comprising:
- a radio access node configured to provide a mobile device access to a network;
- a server configured to communicate with the network, the network comprising a core network configured to determine the mobile device to be monitored based on at least partially an Internet Protocol, IP, address of the mobile device;
- executing, by the server, an IP-based two-way communications protocol with the mobile device by transmitting one or more request messages;
- determining by the server one or more lost responses from the mobile device to the one or more request messages;
- causing, by the server, to generate a request to a management function of the network for triggering the management function of the network to select one or more recovery methods for the mobile device:
- receiving, by the management function of the network, the request for triggering the management function of the network to select one or more recovery methods for the mobile device addressable in the network by the IP address;
- applying, by the management function, at least one recovery method to the mobile device; and after the recovery method has been applied, in response to determining a recovery of the mobile device, transmitting, by the management function, information indicating the recovery of the mobile device to the server.

According to a tenth aspect in accordance with at least some embodiments, there is provided an apparatus comprising means to perform:
- receiving by a mobile device from a network a release or detach indication triggered based at least in part on a trigger message caused by at least one lost response by a server;
- causing by the mobile device a release or detach operation with the mobile communications network;
- establishing a connection with the network;
- causing to receive by the mobile device a request from the server through the connection with the network;
- causing a reply to the request by the mobile device in the connection with the network to the server.

Further aspects in accordance with at least some embodiments may comprise one or more aspects of:
- wherein the another entity is a network element of the communications network
- wherein the another entity is a core network element of the communications network, for example a management element of the communications network such as a management function
- wherein the mobile device comprises a monitoring application installed in the mobile device
- wherein the one or more recovery methods comprise at least a recovery method, where the IP address of the mobile device is maintained and another recovery method, where the IP address of the mobile device is updated
- wherein the another recovery method, where the IP address of the mobile device is updated, is caused by the request to the another entity indicating a trigger for detaching or deregistering the mobile device
- wherein the recovery method, where the IP address of the mobile device is maintained, is caused by the request to the another entity indicating a trigger for releasing a Radio Resource Control Protocol Connection, RRC, of the mobile device
- wherein the recovery method, where the IP address of the mobile device is maintained comprises maintaining the mobile device attached or registered by the another entity
- wherein the execution of the two-way communications protocol is suspended based on the one or more lost responses
- wherein the online server functionality is configured with information identifying the mobile device and the IP address of the mobile device to cause to monitor communications between the mobile device and the online server functionality when activated in response to receiving information identifying the mobile device and the IP address of the mobile device
  - continuing to execute, by the online server functionality, the IP based two-way communications protocol with the mobile device, based on at least one of:
    - in response to receiving, by the online server functionality from the another entity, after the one or more recovery methods have been applied, information indicating a recovery of the mobile device; and
    - a timeout has passed after the one or more recovery methods have been applied
- wherein the one or more lost responses determine a state of the mobile device
- wherein the two-way communications protocol is a request-response protocol
- wherein information indicating the recovery of the mobile device comprises an updated IP address of the mobile device.

BRIEF DESCRIPTION OF THE DRAWINGS

FIG. 1 illustrates an example of an architecture of a communications system in accordance with at least some embodiments;

FIG. 2 and FIG. 3 illustrate examples of methods in accordance with at least some embodiments;

EMBODIMENTS

Figure 3:
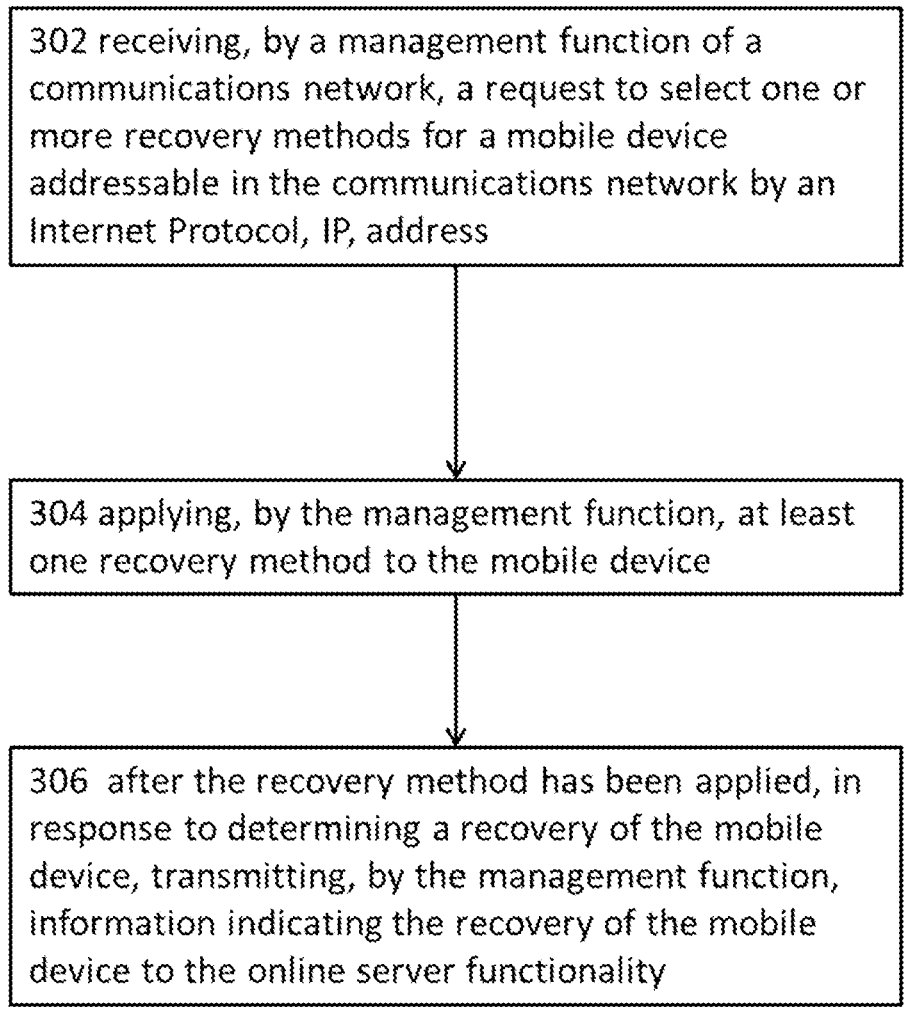

An online server determines mobile device to be monitored based on at least partially an Internet Protocol, IP, address of the mobile device. The online server functionality executes an IP-based two-way communications protocol with the mobile device by transmitting one or more request messages. The online server functionality determines one or more lost responses from the mobile device to the one or more request messages and causes generating a request to another entity for triggering the another entity to select one or more recovery methods for the mobile device. In this way recovery of the mobile device may be facilitated in case of failure of the mobile device.

Inventors have found for example that the cellular radio network may work normally, but the online server functionality does not receive messages from the mobile device. The reason might be a failure in the mobile device. A potential solution to solve problem is described in this specification.

FIG. 1 shows mobile devices 106 configured to be in a wireless connection on one or more communication channels in a cell with an access node 102 (such as eNodeB or gNodeB) providing the cell. The radio access node may be configured to provide a mobile device 106 access to a network. The physical link from a mobile device to a node 102 is called uplink or reverse link and the physical link from the node 102 to the mobile device is called downlink or forward link. It should be appreciated that nodes 102 or their functionalities may be implemented by using any node, host, server or access point etc. entity suitable for such a usage. The current architecture in LTE networks is fully distributed in the radio and fully centralized in the core network.

FIG. 1 illustrates an example of architecture of a communications system in accordance with at least some embodiments. The communications system comprises a communications network that comprises a wireless access network 103 connected to a core network 104. One or more mobile devices 106 may hold subscriptions to the communications network. The wireless access network provides access to the mobile devices, when the mobile devices are within one or more service areas, e.g. cells, of the access network. The access network may comprise one or more access nodes for providing the services areas. The access nodes may be capable of wireless communications with the mobile devices, when the mobile devices are within the service areas. The core network may provide services for the mobile devices that are subscribed to the communications network. The core network may comprise one or more management elements for managing subscription and connections of the mobile devices. Examples of the core network elements comprise a Mobility Management Entity (MME) 112, a Serving Gateway (SGW) 114 and Packet Data Network Gateway (PGW) 116 that are core network elements of an Evolved Packet System (EPS). Managing the subscriptions may comprise for example one or more of authentication of subscribed users and charging of the use of the services. Managing the connections may comprise for example one or more of establishing connections between the mobile devices and the communications network, switching and/or routing of connections between the communications network and other networks, and maintaining connection statuses of the mobile devices. One or more online server functionalities 118 may be connected to the core network and accessible via the internet. An online server functionality 118 may be part of any server or application server.

In a related embodiment, a server, for example an application server comprising an online server functionality 118, is configured to communicate with a network, for example with a network element of the network. The network comprises a core network 104 configured to determine a mobile device to be monitored based on at least partially an Internet Protocol, IP, address of the mobile device.

Monitoring applications may be installed to the mobile devices, the online server functionalities and/or the servers or application servers including the online server functionalities. The monitoring applications provide that the mobile devices, the online server functionalities and/or the servers or application servers may be configured for executing an IP-based two-way communications protocol.

The online server functionality may be implemented by dedicated physical resources or shared physical resources. The physical resources may comprise one or more processor cores, processor cores, memory devices and computers. The shared physical resources may comprise at least partially virtualized physical resources that may be configurable to one or more online server functionalities as needed. In an example an online functionality, for example an online server functionality, may be a cloud service. In contrast to the shared physical resources, the dedicated physical resources comprise hardware units that are configured to be used by a single online functionality.

Network elements, such as the management elements of the core network, of the communications network may be virtualized in accordance with Network Function Virtualization (NFV) framework. Accordingly, a network function, for example a management function may, be a virtualized network element or a dedicated physical network element. Examples of the management functions comprise at least an MME function, SGW function and PGW function.

The communications network may be a $2^{nd}$, $3^{rd}$, $4^{th}$, $5^{th}$ Generation (G) or later generation mobile communications network. Examples of the access nodes comprise base stations in accordance with 2G, 3G, 4G, 5G and later generations of mobile communications network, such as Base Transceiver Stations (BTS), NodeBs (NBs) and evolved NBs (eNBs) and gNBs. Examples of the core network elements comprise network elements in accordance with 2G 3G, 4G, 5G and later generations of mobile communications network and which correspond to one or more of MME, SGW and PDW of the EPS.

The mobile device 106 may be a User Equipment, UE, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal. The mobile device may be connected to one or more sensors or other devices to complement the sensors or other devices.

In an example, the mobile device may be an intermediary device configured to operate as a User Equipment (UE) in the mobile communications network and additionally as a wired switch and/or a wireless switch in a local network. Examples of the intermediary device comprise at least mobile modem devices that have a modem module for connecting to the mobile communications network and one or more local area network interfaces. The local area network interfaces may be wired or wireless interfaces, for example a Wireless Local Area Network (WLAN) hotspot, for example in accordance with IEEE 802.11 family of specifications.

Connections between the mobile device 106, the access network 103 and the core network elements may comprise data transfer connections and signalling connections. The data transfer connections may comprise user plane connections and the signalling connections may comprise control plane connections. The connections may comprise Access Stratum (AS) connections between the mobile device and the access network, and Non-Access Stratum (NAS) connections between the mobile device and one or more core network elements. In an example, control plane connections of the mobile device may comprise an AS connection, e.g. a Radio Resource Control (RRC) protocol connection to the access network, e.g. to an access node, and a NAS connection to the core network, e.g. to a management function (MME in EPC) of the core network. In an example, in EPC the management function may be an MME and in 5G the management function may be Access and Mobility Management Function, AMF. In an example, user plane connections of the mobile device may comprise an AS connection, e.g. a Packet Data Convergence Protocol (PDCP) connection to the access network, e.g. to an access node. Examples of the connections between the mobile device 106, the access network and the core network elements may comprise connections in a mobile communications network that is a 4G network, where the access network is a Long Term Evolution (LTE) network and the core network is an Evolved Packet Core (EPC) comprising a MME serving as a management function, and the mobile device is UE. Other communications networks, for example in accordance with 2G, 3G, and 5G have corresponding connections, e.g. Access and Mobility Management function (AMF) in 5G may be at least partly cover MME functions.

It should be appreciated that the communications network may comprise network elements or corresponding network functions from more than one generation of mobile communications networks. In such a case the network elements or corresponding network functions serving the mobile device may be determined on the basis of a service logic implemented in the communications network.

FIG. 2 illustrates an example of a method in accordance with at least some embodiments. The method may be performed by an online server functionality 118 described in FIG. 1. The method provides that a recovery of the mobile device may be facilitated in case of failure of the mobile device. The mobile device may have an application which can communicate with the online server functionality 118, 120 by getting a request the an online server functionality 118, 120 to respond, for example. The use of application may be restricted to requests from specified address or addresses of the online server functionality 118, 120, for example.

Phase 202 comprises determining, by an online server functionality a mobile device to be monitored based on at least partially an Internet Protocol, IP, address of the mobile device.

Phase 204 comprises executing, by the online server functionality, an IP-based two-way communications protocol with the mobile device by transmitting one or more request messages.

In an embodiment the two-way communications protocol is a request-response protocol. Examples of request-response protocols comprise at least Internet Control Message Protocol, ICMP, or other protocols. In accordance with the two-way communications protocol, in response to one or more request messages from the online server functionality to the mobile device, the mobile device is caused to send one or more responses back to the online server functionality. In this way the mobile device may be caused to send continuously, periodically, or when needed, messages to the online server functionality. The messages may be sent for example once in a certain time interval or at certain time to online server functionality such that a continuous flow of messages may be provided from the mobile device to the online server functionality. Then, in the event of unsuccessfulness of data transfer the continuous flow of messages is interrupted and may be detected by the online server functionality. The unsuccessfulness may be determined based on one or more lost responses.

Phase 206 comprises determining, by the online server functionality, one or more lost responses from the mobile device to the one or more request messages.

In an example, phase 206 comprises that the online server functionality determines the presence of data transfer connection based on one or more responses of the executed request-response protocol. In this way it may be ascertained that the mobile device has connectivity and is connected to the communications network by an operational data transfer connection. If not even a first response is received from the mobile device after phase 204, unsuccessfulness of data transfer may be determined even without responses of the executed request-response protocol.

Phase 208 comprises causing, by the online server functionality, to generate a further request to another entity to select one or more recovery methods for the mobile device.

In an example phase 208 comprises that the another entity is a network element of the communications network. The network element may be a core network element of the communications network, for example a management element of the communications network such as a management function.

In an embodiment phase 208 comprises that the one or more recovery methods comprise at least a recovery method, where the IP address of the mobile device is maintained and another recovery method, where the IP address of the mobile device is updated.

In an example, phase 208 comprises that the IP address of the mobile device is updated by an allocation procedure, where an IP address is allocated to the mobile device and the allocated IP address replaces a current IP address of the mobile device. It should be appreciated that although it is not necessary that the IP address of the mobile device is changed, when the IP address of the mobile device is updated, there is no guarantee that the current IP address of the mobile device is maintained, whereby the update of the IP address may also be referred to a change of the IP address.

In an embodiment phase 208 comprises that the another recovery method, where the IP address of the mobile device is updated, is caused by the request to another entity indicating a trigger for detaching or deregistering the mobile device.

In an embodiment phase 208 comprises that the recovery method, where the IP address of the mobile device is maintained, is caused by the request to another entity indicating a trigger for detaching or deregistering the mobile device.

In an embodiment phase 208 comprises that the recovery method, where the IP address of the mobile device is maintained is caused by the request to another entity indicating a trigger for releasing a Radio Resource Control Protocol Connection, RRC, of the mobile device.

In an embodiment, phase 206 comprises that the execution of the two-way communications protocol is suspended based on the one or more lost responses.

In an embodiment phase 204 comprises that the online server functionality is configured with information identifying the mobile device and the IP address of the mobile device to cause to monitor communications between the mobile device and the online server functionality when activated in response to receiving information identifying the mobile device and the IP address of the mobile device In an embodiment phase 204 comprises continuing to execute, by the online server functionality, the IP-based two-way communications protocol with the mobile device, based on at least one of:

in response to receiving, by the online server functionality from the management function, after the one or more recovery methods have been applied, information indicating a recovery of the mobile device; and a timeout has passed after the one or more recovery methods have been applied.

In an embodiment phase 208 comprises that the one or more lost responses determine a state of the mobile device.

In an example phase 208 comprises that the lost responses determine that the state of the mobile device is a failure state.

In an example phase 202 comprises determining that the mobile device is connected to the communications network on the basis of information obtained from the management function. The information obtained from the management function may comprise an IP address of the mobile device. When the mobile device has an IP address in the communications network, the mobile device may have both user plane and control plane connections to the communications network. The control plane is controlled by the management function. The online server functionality is communicating in the user plane with the mobile device.

In an example phase 206 comprises determining a failure to transmit data in uplink direction based on the lost responses.

In an example phase 206 comprises the lost responses based at least partly on operational information of the two-way communications protocol comprising one or more of a number of requests transmitted;
a number of responses received;
a number of lost responses to requests;
a time between responses and/or since the last response.

FIG. 3 illustrate an example of a method in accordance with at least some embodiments. The method may be performed by management function described in FIG. 1, for example an MME 112. The method facilitates recovery of the mobile device in case of failure of the mobile device.

Phase 302 comprises receiving, by a management function of a communications network, a request to select one or more recovery methods for a mobile device addressable in the communications network by an Internet Protocol, IP, address.

Phase 304 comprises applying, by the management function, at least one recovery method to the mobile device.

Phase 306 comprises, after the recovery method has been applied, in response to determining a recovery of the mobile device, transmitting, by the management function, information indicating the recovery of the mobile device to the online server functionality.

In an example phase 302 comprises that the request comprises information indicating the recovery method. The recovery method may comprise at least a recovery method, where the IP address of the mobile device is maintained and another recovery method, where the IP address of the mobile device is updated.

In an example phase 304 comprises that the management function selects the recovery method and applies the selected recovery method. The recovery method may be determined based on a policy that is stored in connection with the management function. On the other hand if the request comprises information indicating the recovery method, the recovery method indicated by the request may be selected.

In an embodiment, phase 304 comprises that the one or more recovery methods comprise at least a recovery method, where the IP address of the mobile device is maintained and another recovery method, where the IP address of the mobile device is updated.

In an embodiment, phase 304 comprises that the another recovery method, where the IP address of the mobile device is updated comprises detaching or deregistering, by the management function, the mobile device from the communications network in response to receiving a request indicating a trigger for detaching or deregistering the mobile device.

In an embodiment, phase 304 comprises that the recovery method, where the IP address of the mobile device is maintained comprises releasing by the management function a Radio Resource Control Protocol Connection, RRC, of the mobile device, based on a request indicating a trigger for releasing the Radio Resource Control Protocol Connection, RRC, of the mobile device.

In an example, phase 302 comprises that the request indicates a trigger for detaching or deregistering the mobile device, or a trigger for releasing the Radio Resource Control Protocol Connection, RRC, of the mobile device.

Figure 4:
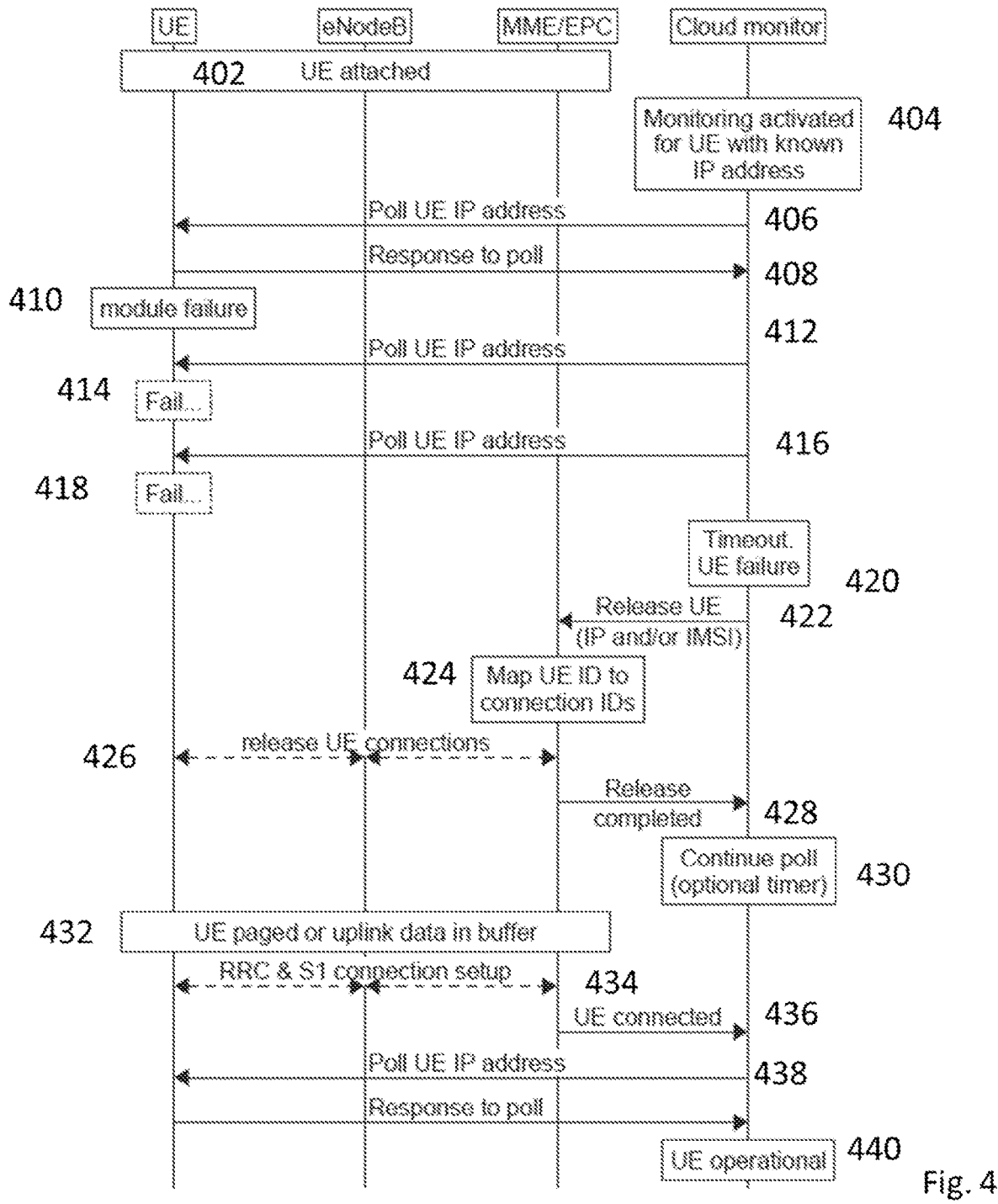
FIG. 4 and FIG. 5 illustrate examples of sequences in accordance with at least some embodiments.

FIG. 4 illustrates an example of a sequence in accordance with at least some embodiments. The sequence is described in an example in accordance with the architecture described with FIG. 1, where a communications network is 4G network and the access network is a Long Term Evolution (LTE) network and the core network is an Evolved Packet Core (EPC) comprising a MME serving as a management function. The online server functionality is referred to a Cloud Monitor (CM) in this example. The mobile device may be a UE connected to the mobile communications network via an eNB. The mobile device has an IP address such that the UE may be addressable by the IP address in the mobile communications network, whereby data maybe communicated to the UE and data may be communicated from the UE over a data transfer connection. The IP may be allocated to the UE in connection with attaching or registering the UE to the mobile communications network. The sequence describes a recovery method of the UE, where the IP address of the UE is maintained. In the recovery method, data transfer connections of the UE are released such that the UE is maintained attached to the mobile communications network such that the UE may be reached by paging procedure via the mobile communications network and/or the UE may establish data transfer connections for transfer of buffered data.

Phase 402 comprises attaching the UE to the mobile communications network. When the UE is attached, a connection status of the UE may a connected state, for example an ECM-CONNECTED state.

Phase 404 comprises activating monitoring a data transfer connection of the UE. The monitoring may comprise the CM executing an IP-based request-response protocol with the UE for monitoring a data transfer connection of the UE in accordance with phase 204. Phases 406 and 408 describe an example of executing the IP-based request-response protocol by the CM with UE.

In one embodiment, an indication of normal, no connection, or abnormal cellular connection of the mobile device is received by CM which may then decide whether, or not, to monitor mobile device.

Phase 406 comprises the CM transmitting a request, e.g. a poll, to the UE in accordance with the IP-based request-response protocol.

Phase 408 comprises the CM receiving a response to the request in phase 406 from the UE in accordance with the IP-based request-response protocol. Accordingly, since the UE supports the IP-based request-response protocol the UE transmits CM the response to the request from the CM. The response is received by the CM provided that the data transfer connection of the UE is operative and there is no fault at least on the IP layer or on a higher protocol layer.

Phase 410 comprises that the UE has a failure. The failure may be a software error and/or a physically broken hardware component of the UE. Due to the failure of the UE, the UE may behave abnormally, which causes a failure of the data transfer connection. The abnormal behavior of the UE concerns protocols and protocol layers used for the IP-based request-response protocol between the CM and the UE, whereby the abnormal operation cannot be detected by the mobile communications network. However, the abnormal behavior may be detected by the CM in accordance with phase 206 of FIG. 2. Phases 412 to 418 describe an example of executing the request-response protocol between the CM and the UE, when the UE has a failure and the CM does not receive response to the poll even though the mobile communications network states that radio connection is working well and no failures are found.

Phases 412 and 416 comprise the CM transmitting requests in accordance with phase 406. However, since the UE is behaving abnormally because of the failure, the UE does not transmit any responses to the requests in accordance with the IP-based request-response protocol. Accordingly, instead of transmitting responses to the CM in accordance with phase 408, the UE fails to transmit the responses in phases 414 and 418.

Phase 420 comprises the CM determining unsuccessfulness of the data transfer connection of the UE based at least partially on the responses of the fault or faults, in accordance with phase 206.

In an embodiment, phase 420 comprises that the execution of the request-response protocol is suspended after the data transfer connection of the UE is determined faulty. In this way the monitoring may be deactivated until the UE has recovered from the failure and operating normally. In an example, the execution of the request-response protocol is suspended at least until a timeout has lapsed and/or a trigger to continue monitoring is received. In one example the poll request may be repeated after timeout to get information whether, or not, the UE failure is occasional.

In an embodiment, phase 422 comprises causing, by the CM, a request to the mobile communications network indicating a trigger for releasing the data transfer connection of the UE from the mobile communications network. The trigger may cause releasing a Radio Resource Control Protocol Connection, RRC, of the UE. In this way the UE may be maintained attached to the mobile communications network and the UE may be reached by paging procedure via the mobile communications network and/or the UE may establish data transfer connections for transfer of buffered data. Either paging procedure or buffered data in UE will trigger establishment of data transfer connection, for example.

In an embodiment, phase 422 comprises that the request is to maintain the UE attached to the mobile communications network. In this way the MME may cause release of the data transfer connection of the UE and maintain the UE attached to the mobile communications network. In an example the request may comprise information indicating that the UE should be released such that the UE is maintained attached to the mobile communications network.

In an example, the request in phase 422 comprises a request to release user plane and control plane of the UE. The connections that are released provide that the UE enters idle state.

In an example phase 422 comprises releasing at least part of the user plane and control plane connections. The control plane connections may comprise a control plane connection between the UE and the eNB, for example an RRC connection. The user plane connections may comprise a user plane connection between the UE and the eNB, for example a PDCP connection. However, NAS connection of the UE is maintained such that the UE is maintained attached to the mobile communications network.

In an example phase 422 comprises that the request to release data transfer connection of the UE comprises an identifier of the UE. The identifier of the UE may be an Internet Protocol, IP, address of the UE or an International Mobile Subscriber Identifier (IMSI) or both of them may be used as the identifier.

Phase 424 comprises mapping an identifier of the UE to connections of the UE. The connections may comprise at least the data transfer connection. The identifier may be received in phase 422 from the CM.

Phase 426 comprises the MME causing a release of the connections of the UE. The connections to be released may be identified based on the mapping in phase 424. The connections maybe released by using 51 procedures.

Phase 428 comprises the MME transmitting information, e.g. a release complete message, indicating that the data transfer connection of the UE has been released.

Phase 430 comprises continuing to execute, by the CM, the IP-based request-response protocol with the UE for monitoring the data transfer connection of the mobile device based on that a timeout has passed after release of the data transfer connection. In this way the monitoring is activated once the timeout has lapsed and the UE may have established one or more new data transfer connections to replace the released connections, whereby reliable monitoring may be provided.

Phase 434 comprise establishing one or more connections for the UE. The connections may comprise one or more user plane connections and control plane connections of the UE.

The user plane connections may comprise a data transfer connection for transfer of data between the UE and the mobile communications network after the earlier data transfer connections were released in phase 426. In an example, the connections may be established in response to phase 432 comprising the MME paging the UE after the MME has determined that the connections of the UE have been released in phase 426. Alternatively or additionally phase 434 comprises establishing the connections in response to phase 432 comprising the UE accessing the mobile communications network for transferring uplink data. This may happen, when the UE has buffered data for the uplink.

Phase 436 comprises the MME transmitting to the CM information indicating a successful establishment of one or more data transfer connections with the UE after release of the mobile device in phases 426 and 428. The successful establishment of the data transfer connections may indicate the CM that the UE is capable of executing IP-based protocols, for example the IP-based request-response protocol, with the CM for monitoring a data transfer connection of the UE. The information indicating the successful establishment received from the MME may comprise IMSI and/or IP of the UE such that the CM may identify the UE and determine to activate monitoring.

Phase 438 comprises that the monitoring is activated. The monitoring is continued by executing the request-response protocol for monitoring the data transfer connection of the mobile device in accordance with phase 430. Accordingly, the monitoring may be continued after a time out after receiving the information in phase 436 and/or in response to receiving the information indicating a successful establishment of at least one data transfer connection with the UE in phase 436.

Phase 440 comprises the CM determining that the UE is operational based on at least partially on one or more responses of the executed request-response protocol in accordance with phase 406 and 408. In an example a successful response to a request in accordance with the request-response protocol may be used to determine that the UE is operational. It should be appreciated that instead of determining that the UE is operational it is viable that an unsuccessfulness of the data transfer connection of the UE based at least partially on one or more responses of the executed request-response protocol is determined similar to phase 420.

Figure 5:
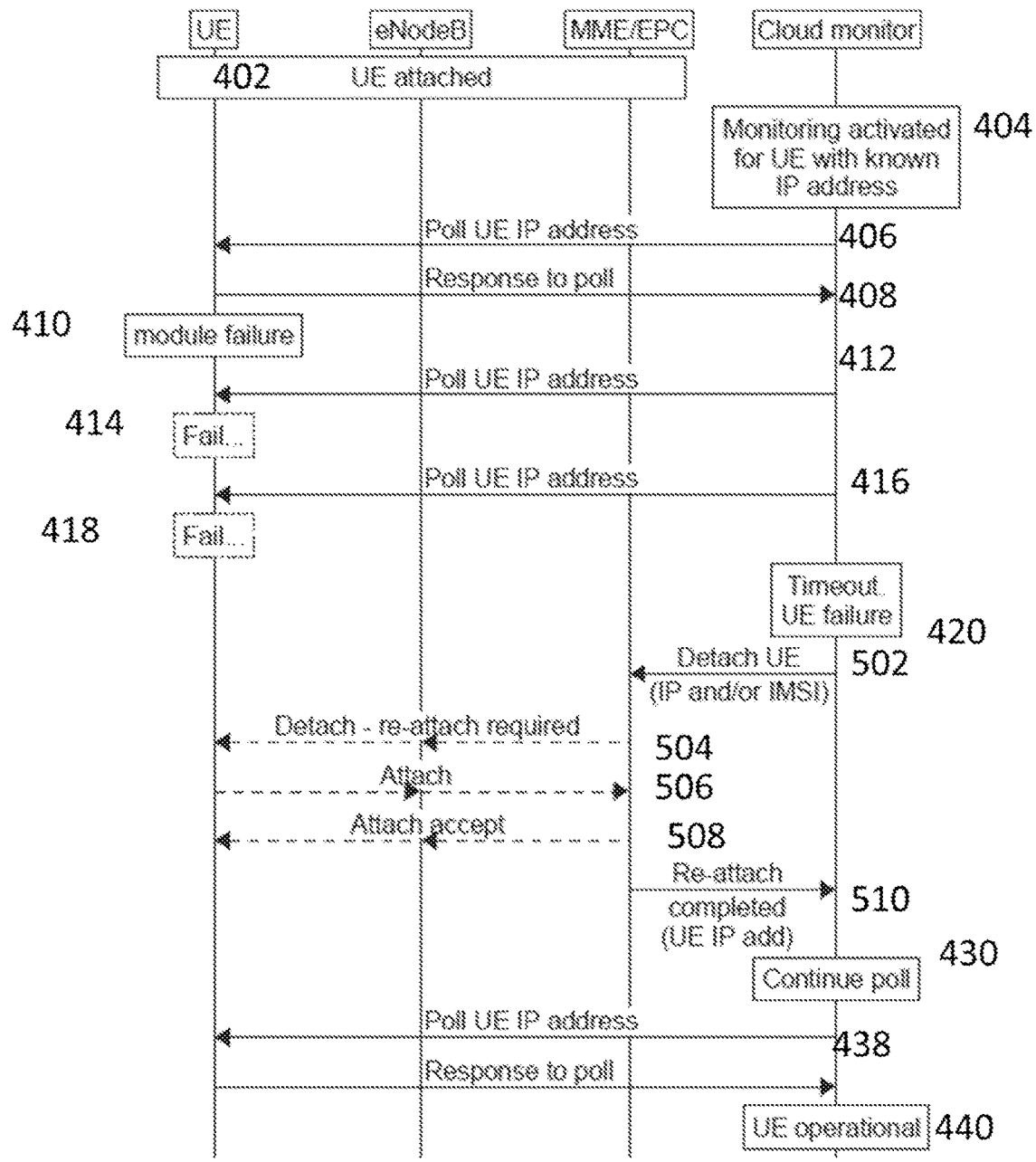

FIG. 5 illustrates an example of a sequence in accordance with at least some embodiments. The sequence is described in an example in accordance with the architecture described with FIG. 1, where a mobile communications network is 4G network and the access network is a Long Term Evolution (LTE) network and the core network is an Evolved Packet Core (EPC) comprising a MME serving as a management function. The online server functionality is referred to a Cloud Monitor (CM) in this example. The UE may be connected to the mobile communications network via an eNB. The mobile device has an IP address such that the UE may be addressable by the IP address in the mobile communications network, whereby data maybe communicated to the UE and data may be communicated from the UE over a data transfer connection. The IP may be allocated to the UE in connection with attaching or registering the UE to the mobile communications network. The sequence describes a recovery method of the UE, where the IP address of the mobile device is updated. In the recovery method, data transfer connections of the UE are released such that the UE is detached or deregistered from the mobile communications network such that the UE may not be reached via the mobile communications network. In the following the sequence detach of the UE is described but also deregister could be made.

The sequence provides releasing data transfer connections of the UE such that the UE is not reachable via the mobile communications network. The sequence comprises phases 402 through 420, 430, 438 and 440 described with the sequence of FIG. 5.

As a difference to the sequence of FIG. 4, phase 420 is followed by phase 502 that comprises the CM causing a request indicating a trigger for detaching or deregistering the UE from the mobile communications network. When the UE is detached, the user plane and control plane of the UE are released and the UE is no longer reachable by a paging procedure via the mobile communications network. Thus UE is e.g. turned off and cannot be reached. After UE has turned on it may attach to network by paging procedure.

In an example, phase 502 comprises the CM transmitting a request to detach the UE from the mobile communications network. The request may comprise information identifying the UE to be detached. The information may comprise an identifier of the UE. The identifier of the UE may be an Internet Protocol, IP, address of the UE or an International Mobile Subscriber Identifier (IMSI) or both of them may be used as the identifier.

Phase 504 comprises the MME causing to release the data transfer connection of the UE.

In an example, phase 504 comprises the MME causing to detach the UE. The detach may be performed by a NAS procedure between the UE and the MME. The MME may transmit a detach message to the UE. The detach message may comprise information indicating the UE to re-attach to the mobile communications network. In an example the detach message comprises an information element indicating that a re-attach required is required, for example an information element indicating "re-attach required". The detach message may be in accordance with 3GPP non-access stratum procedure.

Phases 506 and 508 comprise re-attaching the UE to the mobile communications network. Phase 506 may comprise the UE transmitting an attach message to the MME and phase 508 may comprise the MME transmitting an attach accept message to the UE in response to the attach message.

Phase 510 comprises, after the data transfer connection has been released in accordance with phase 504, in response to the MME determining a successful establishment of at least one data transfer connection of the UE, the MME transmitting to the CM information indicating the successful establishment of the at least one data transfer connection to the online server functionality.

In an example, phase 510 comprises after the UE has been detached in accordance with phase 504, in response to the MME determining a re-attach of the UE, the MME transmitting to the CM information indicating the re-attach. The information indicating the re-attach may comprise a re-attach complete message.

In an embodiment, phase 510 comprises transmitting by the MME to the CM, after the UE has been caused to detach from the mobile communications network and the at least data transfer connection has been established, an IP address of the UE. In this way the CM may detect a fault of a data transfer connection of the UE after the UE has re-attached to the mobile communications network in accordance with phases 506 to 508. Particularly, if the UE was detached in phase 504 by detach message with "re-attach required", the IP address of the UE may have been changed or updated, when the UE has re-attached and the data transfer connection has been established, whereby the changed or updated IP address may be communicated to the CM for monitoring the data transfer connection. The IP address may be included in a re-attach complete message.

In an example, IMSI of UE is administrated by CM. The IMSI of UEs which need to be monitored are maintained by CM. When a new UE is attached, e.g. in phase 402, or UE re-attached, e.g. in phases 506 to 508, the IMSI of UE is communicated to CM, or CM requests IMSI of UE with at least IMSI information from the MME, in accordance with phase 510. CM decides which UEs are needed to be monitored. The reattached UE is checked whether or not the UE need to be monitored. After the mobile communications network knows the IP address or new IP address, mobile communications network communicates the IP address with IMSI information to CM or CM requests the IP address with known or new IMSI.

Figure 6:
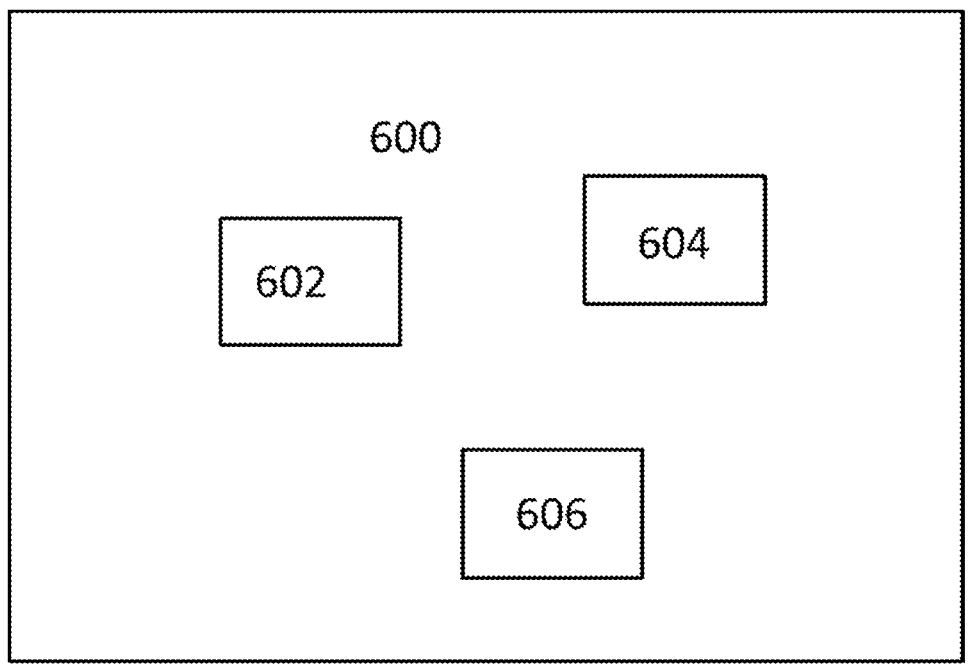
FIG. 6 illustrate an example of an apparatus in accordance with at least some embodiments.

FIG. 6 illustrates an example of an apparatus in accordance with at least some embodiments. The apparatus 600 may be a mobile device, network element, a management function, server or online server functionality described with FIG. 1.

The apparatus may comprise circuitry for performing one or more functionalities according to an embodiment. The apparatus may comprise at least transmitting circuitry (TC) 606 for transmitting one or more messages of a request, a release, an attach, a detach, a response, poll, re-attach, information indicating establishment of data transfer connection, an IP address, information indicating recovery, and a receiving circuitry (RC) 604 for receiving one or more messages of a request, a release, an attach, a detach, a response, poll, re-attach, information indicating establishment of data transfer connection, an IP address, and a processing circuitry (PC) for executing an IP-based two-way communications protocol, determining a mobile device to be monitored, determining lost responses, determining fault, determining whether a mobile device is connected to a mobile communications network, determining unsuccessfulness of data transfer connection, determining successful establishment of at least data transfer connection, determining a recovery, applying a recovery method, causing to generate a further request. The receiving circuitry, transmitting circuitry and processing circuitry may be connected for input and/or output of information between the receiving circuitry, transmitting circuitry and processing circuitry.

Figure 7:
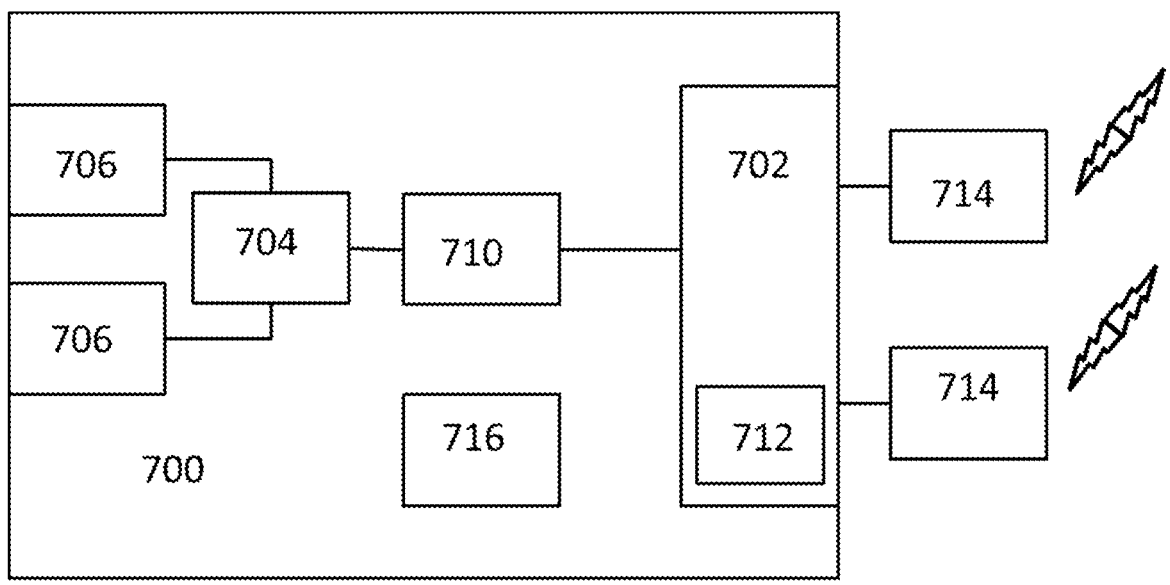
FIG. 7 illustrates an example of a mobile device according to at least some embodiments.

FIG. 7 illustrates an example of a mobile device according to at least some embodiments. The mobile device 700 may be a mobile device described with FIG. 1.

The mobile device comprises a modem module 702 for connecting to a communications network and an interface to a local area network (LAN). The interface may be a wired LAN interface or a wireless LAN interface. The wired LAN may be Ethernet. The wireless LAN may be based on the IEEE 802.11 family of standards. The wired LAN interface may comprise one or more ports 706 that are connected to a switch 704. The mobile device may comprise an IP stack 710. The IP stack comprises IP-based protocols. Examples of the IP based protocols comprise an IP-based request-response protocol for monitoring a data transfer connection of the mobile device, ICMP, and the IP. The IP stack may be configured to operate with the LAN interface and modem module for providing one or more of routing, network address translation, DHCP and firewall functionalities to the modem module and the LAN interface. The modem module may comprise a subscription to the communications network. The subscription maybe provided on a subscriber identity module (SIM) card 712 connected to the modem module. One or more antennas 714 may be connected to the modem module for wireless communications over radio frequencies with the communications network. The mobile device may further comprise management and control software (SW) 716 configured to cause on one or more functionalities, when executed by the mobile device. The mobile device may comprise memory for storing software. The mobile device may comprise processor for executing the software stored to the memory for causing a method in accordance with an embodiment.

It should be appreciated that as used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a user equipment or access node, to perform various functions) and
  (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment an apparatus according to an embodiment, for example the apparatus in FIG. 6, comprises an at least one processor; and at least one memory including computer program code, the at least one memory and computer program code configured to, with the at least one processor, cause the performance of the apparatus.

For example, the apparatus 600, may comprise a processor, which may comprise, for example, a single- or multi-core processor wherein a single-core processor comprises one processing core and a multi-core processor comprises more than one processing core. The processor may a separate device and/or included in the PC, RC and/or TC. The processor may comprise a TEE. Processor may comprise more than one processor. A processing core may comprise, for example, a Cortex-A8 processing core manufactured by ARM Holdings or a Steamroller processing core produced by Advanced Micro Devices Corporation. Processor may comprise at least one Qualcomm Snapdragon and/or Intel Atom processor. Processor may comprise at least one application-specific integrated circuit, ASIC. Processor may comprise at least one field-programmable gate array, FPGA. Processor may be means for performing method steps in apparatus. Processor may be configured, at least in part by computer instructions, to perform actions.

For example the apparatus 600 may comprise memory. The memory may a separate device and/or included in the PC, RC and/or TC. Memory may comprise random-access memory and/or permanent memory. Memory may comprise at least one RAM chip. Memory may comprise solid-state, magnetic, optical and/or holographic memory, for example. Memory may be at least in part accessible to processor. Memory may be at least in part comprised in processor. Memory may be means for storing information. Memory may be a non-transitory computer readable medium. Memory may comprise computer instructions that processor is configured to execute. When computer instructions configured to cause processor to perform certain actions are stored in memory, and apparatus overall is configured to run under the direction of processor using computer instructions from memory, processor and/or its at least one processing core may be considered to be configured to perform said certain actions. Memory may be at least in part comprised in processor. Memory may be at least in part external to apparatus but accessible to apparatus 600.

An embodiment concerns a non-transitory computer readable medium having stored thereon a set of computer readable instructions that, when executed by at least one processor, cause an apparatus to at least to perform one or more phases of a method described herein.

Figure 8:
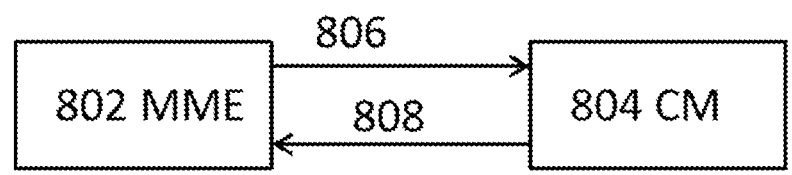
FIG. 8 illustrates an example sequence of setting up an online server functionality.

FIG. 8 illustrates an example sequence of setting up an online server functionality. The setting up of the online serve functionality is described in the context of FIG. 4 and FIG. 5, where the online server functionality may be a CM 804 connected to a MME 802 in a core network. The setting up of the CM provides that the CM has information of UE, e.g. IMSI of mobile device, that are attached to the mobile communications network and which have data transfer connections.

The setting up of the online server functionality comprises at least phase 806, where the MME transmits to the CM information indicating an attachment of the UE to the mobile communications network. The CM may acknowledge the reception of the information by sending an acknowledgement message in phase 808.

The phase 806 may be performed after phase 402 in FIG. 4 and FIG. 5. The information indicating attachment may comprise information identifying the UE and a data transfer connection of the UE. In this way the CM is provided information that the UE is capable of being monitored. The information identifying the UE may identify the UE in the mobile communications network. In an example the information identifying the UE is IMSI. The information identifying the data transfer connection may provide an address of the UE in a data network. In an example the information identifying the data transfer connection is an IP address of the UE.

It should be appreciated that phase 806 may indicate a re-attachment of the UE. Accordingly, phase 806 may be in accordance with phase 510 described in FIG. 5.

Phase 806 provides that the CM has information indicating attachment of UE, whereby the UE is capable of being monitored. The information may be maintained and updated by the CM. In an example, of maintaining an updating information indicating attachment of UE, when the CM receives in phase 806 the information indicating an attachment of the UE, the CM may store the received information. In this way the CM may maintain information of the attached UE. The information indicating attachment of UE may be updated to indicate that the UE cannot be monitored on the basis of determining unsuccessfulness of the data transfer connection, release of data transfer connection and/or a detach of the UE. The information indicating attachment of UE may be updated in connection with at least some of the phases described with FIG. 4 and FIG. 5 for example phases 420, 422, and 502. Then later, when the UE has successfully established one or more data transfer connections the information in this regard may be transmitted by the MME to the CM. In this way the CM may update the information of UE capable of being monitored. As is clear from the above the CM may monitor many UEs and maintain information indicating their attachment by maintaining for UE information identifying the UE and a data transfer connection of the UE.

Figure 9:
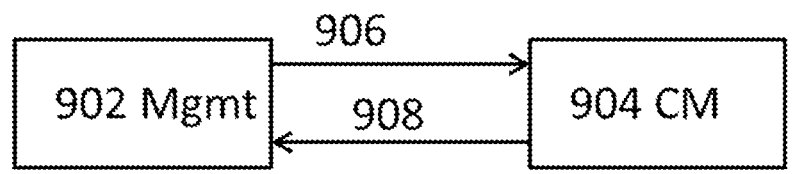
FIG. 9 illustrates an example sequence of managing an online server functionality.

FIG. 9 illustrates an example sequence of managing an online server functionality 904. The online server functionality may be a CM 904 connected to a MME in a core network described in the context of FIG. 4 and FIG. 5. The managing of the CM provides controlling the UE that the CM may monitor. A management entity 902 may be connected to the CM. The management entity may be a UE or a computer device that may be connected to the CM via a data network connection, for example via the internet.

Phase 906 comprises the management entity transmitting a message for configuring the CM for monitoring a UE. The CM may acknowledge the reception of the information by sending an acknowledgement message in phase 908.

The message in phase 906 may comprise information identifying the UE and a data transfer connection of the UE. The UE may be identified by IMSI of the UE and the data transfer connection may be identified by an IP address. After receiving, for example in response to receiving, the information identifying the UE and the data transfer connection of the UE, the CM may store the information received in phase 906. However, it should be appreciated that monitoring of the data transfer connection may not be activated immediately rather the CM may wait for a trigger to activate monitoring the data transfer connection. Accordingly, the CM may activate monitoring in response to receiving information indicating attachment of UE for example in accordance with phase 806 in FIG. 8. Afterwards, the monitoring may be deactivated on the basis of determining unsuccessfulness of the data transfer connection, for example in accordance with phase 420 in FIG. 4. Information of the capability of the UE to be monitored may be maintained by the CM as described above with phase 806.

In an embodiment, the CM 904 is configured with information identifying a plurality of mobile devices and monitoring of data transfer connections of the mobile devices is activated in response to receiving information identifying a data transfer connection and the associated mobile device and the associated mobile device is identified by the information configured to the CM. In this way the CM may monitor at least those data transfer connections that have been configured to the CM. Information identifying mobile device may be configured as described with phase 906. In an example the information identifying a data transfer connection and the associated mobile device may be received by the CM, when the mobile device is attached or re-attached to a communications network or in connection with a successful establishment of at least one data transfer connection of the UE. Then, if information identifying the mobile device is not configured to the CM, monitoring is not activated. On the other hand, if information identifying the mobile device is configured to the CM, the monitoring may be activated for example in accordance with phase 404 in FIG. 4. In this way the CM may be connected to the MME and receive information identifying UE and data transfer connections of the UE from the MME without necessarily activating monitoring of data transfer connections. Thus, the monitoring may be activated for those UE that are configured to the CM.

Figure 10:
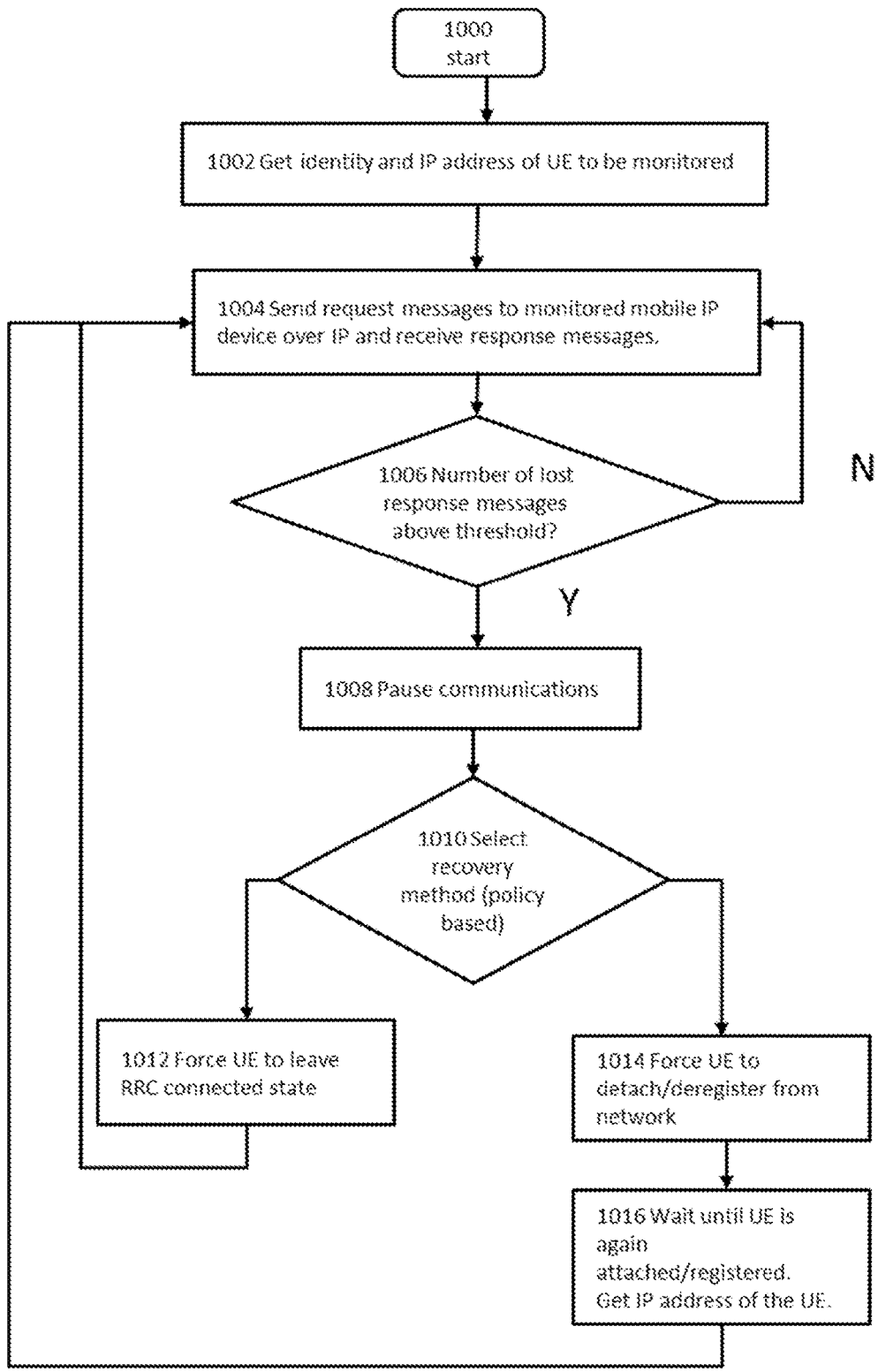
FIG. 10 illustrates a method in accordance with at least some embodiments.

FIG. 10 illustrates a method in accordance with at least some embodiments. The method provides applying a recovery method for the mobile device.

Phase 1000 comprises starting the method, when an online server functionality is capable of communicating with a mobile device and a management function, for example an MME or an AMF, of the communications network serving the mobile device.

Phase 1002 comprises obtaining an identity and IP address of the mobile device to be monitored. In this way the online server functionality may able the mobile device to be monitored. It should be appreciated that the identity and the IP address may be configured beforehand to the online server functionality, whereby it may be sufficient to receive the identity of the mobile device to start the monitoring.

Phase 1004 comprises monitoring in accordance with phase 204 of FIG. 2. In an example, the monitoring may comprise sending one or more request messages to monitored mobile IP device over IP and receive responses.

Phase 1006 comprises determining one or more lost responses to the one or more request messages from the mobile device in accordance with phase 206 of FIG. 2. In an example the number of lost responses may be determined and compared to a threshold value.

If the lost responses are determined, for example if the number of lost responses is above a threshold, the method may proceed to phase 1008. The lost responses may be used to indicate unsuccessfulness of the communications by the two-way communications protocol. Otherwise the method may proceed to phase 1004 to continue monitoring.

Phase 1008 comprises pausing the communications by the two-way communications protocol. Pausing is optional phase.

Phase 1010 comprises selecting a recovery method from two or more recovery methods. If a recovery method, where the IP address of the mobile device is maintained is selected, the method proceeds to phase 1012. If a recovery method, where the IP address of the mobile device is updated is selected, the method proceeds to phase 1014.

Phase 1012 comprises forcing the mobile device to leave RRC connected state. In an example, forcing the mobile device to leave the RRC connected state may comprise releasing a Radio Resource Control Protocol Connection, RRC, of the mobile device. In an example the release may be caused by the online server functionality causing a request to the management function, indicating a trigger for releasing a Radio Resource Control Protocol Connection, RRC, of the mobile device.

Phase 1014 comprises forcing the mobile device to detach or deregister from the communications network. In an example detach or deregister may be forced by the online server functionality causing a request to the management function indicating a trigger for detaching or deregistering the mobile device.

Phase 1016 comprises waiting until the mobile device has attached or registered to the communications network. Furthermore, obtaining optionally the new IP address of the mobile device with same identity as in 1002.

After phases 1016 and 1012 the method may proceed to phase 1004, where the monitoring may be continued. In an embodiment, the monitoring may be continued continuing to execute, by the online server functionality, the IP-based two-way communications protocol with the mobile device, based on at least one of:

in response to receiving, by the online server functionality from the management function, after the one or more recovery methods have been applied, information indicating a recovery of the mobile device; and a timeout has passed after the one or more recovery methods have been applied.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used at least for the purpose of describing particular embodiments and is not intended to be limiting.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example in an accordance with at least some embodiments may be referred to herein along with alternatives for the various components thereof. It is understood that such embodiments, examples, and alternatives are not to be construed as de facto equivalents of one another, but are to be considered as separate and autonomous representations of some embodiments.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts of some embodiments. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

At least some of the embodiments described above are applicable in monitoring a mobile device.

ACRONYMS LIST

AMF Access and Mobility Management Function
AS Access Stratum
BTS Base Transceiver Stations
eNB Evolved NB
EPC Evolved Packet Core
EPS Evolved Packet System
G Generation
IMSI International Mobile Subscriber Identity
IoT Internet of Things
IP Internet Protocol
LAN Local Area Network
M2M Machine-to-Machine
MEC Multi-Access Edge Computing
MME Mobility Management Entity
NB NodeB
NR New Radio
NFV Network Function Virtualization
NAS Non-Access Stratum
PC Processing Circuitry
PDCP Packet Data convergence Protocol
PGW Packet Data Network Gateway
RC Receiving Circuitry
RRC Radio Resource Control
SGW Serving Gateway
SW Software
TC Transmitting Circuitry
UE User Equipment
WLAN Wireless Local Area Network

REFERENCE SIGNS LIST

102 Access node
103 Access network
104 Core network
106 mobile device
112 Mobility Management Entity
114 Serving Gateway
116 Packet Data Network Gateway
118, Online Server Functionality
202 to 208 Phases of FIG. 2
302 to 306 Phases of FIG. 3
422 to 428
432 to 436 Phases of the sequence of FIG. 4
402 to 420
430, 438,
440 Phases of the sequences of FIG. 4 and FIG. 5
502 to 510 Phases of the sequences of FIG. 5
600 Apparatus
602 Processing Circuitry
604 Receiving Circuitry
606 Transmitting Circuitry
700 Mobile device
702 Modem module
704 Switch
706 Ports
710 Internet Protocol Stack
712 SIM card
714 Antennas
716 Management & Control SW
802 MME in FIG. 8
804 CM in FIG. 8
806, 808 Phases of FIG. 8
902 Management entity in FIG. 9
904 CM in FIG. 9
906, 908 Phases in FIG. 9
1002 to 1016 Phases of FIG. 10

The invention claimed is:

1. An apparatus, comprising at least one processor; and at least one memory including computer program code, the at least one memory and computer program code configured to, with the at least one processor, cause the apparatus to perform:
   determine, by an online server functionality, a mobile device to be monitored based on at least partially an Internet Protocol, IP, address of the mobile device;
   execute, by the online server functionality, an IP-based two-way communications protocol with the mobile device by transmitting one or more request messages;
   determine, by the online server functionality, one or more lost responses from the mobile device to the one or more request messages;
   pause communication of the IP-based two-way communications protocol, responsive to a number of the one or more lost responses satisfying a threshold; and
   cause, by the online server functionality, to generate a request to another entity for triggering the another entity to select one or more recovery methods for the mobile device.

2. The apparatus of claim 1, wherein the apparatus is further caused to select at least a recovery method, where the IP address of the mobile device is maintained and another recovery method, where the IP address of the mobile device is updated.

3. The apparatus of claim 2, wherein the another recovery method, where the IP address of the mobile device is updated, is caused by the request to the another entity indicating a trigger for detaching or deregistering the mobile device.

4. The apparatus of claim 2, wherein the recovery method, where the IP address of the mobile device is maintained, is caused by the request to the another entity indicating a trigger for releasing a Radio Resource Control Protocol Connection, RRC, of the mobile device.

5. The apparatus of claim 2, wherein the recovery method, where the IP address of the mobile device is maintained comprises maintaining the mobile device attached or registered by the another entity.

6. The apparatus of claim 1, wherein the execution of the two-way communications protocol is suspended based on the one or more lost responses.

7. The apparatus of claim 1, wherein the online server functionality is configured with information identifying the mobile device and the IP address of the mobile device to cause to monitor communications between the mobile device and the online server functionality when activated in response to receiving information identifying the mobile device and the IP address of the mobile device.

8. The apparatus of claim 1, comprising:
   continuing to execute, by the online server functionality, the IP based two-way communications protocol with the mobile device, based on at least one of:
   in response to receiving, by the online server functionality from the another entity, after the one or more recovery methods have been applied, information indicating a recovery of the mobile device; and
   a timeout has passed after the one or more recovery methods have been applied.

9. The apparatus of claim 1, wherein the one or more lost responses determine a state of the mobile device.

10. The method of claim 8, wherein the two-way communications protocol is a request-response protocol.

11. An apparatus comprising at least one processor; and at least one memory including computer program code, the at least one memory and computer program code configured to, with the at least one processor, cause the apparatus to:
receive, by a management function, a request to select one or more recovery methods for a mobile device addressable in a communications network by an Internet Protocol, IP, address;
apply, by the management function, at least one recovery method to the mobile device; and
after the recovery method has been applied, in response to determining a recovery of the mobile device, transmit, by the management function, information indicating the recovery of the mobile device to an online server functionality.

12. The apparatus of claim 11, wherein the one or more recovery methods comprise at least one of a recovery method, where the IP address of the mobile device is maintained and another recovery method, where the IP address of the mobile device is updated.

13. The apparatus of claim 12, wherein the another recovery method, where the IP address of the mobile device is updated comprises detaching or deregistering, by the management function, the mobile device from the communications network in response to receiving the request indicating a trigger for detaching or deregistering the mobile device.

14. The apparatus of claim 12, wherein the recovery method, where the IP address of the mobile device is maintained, comprises releasing by the management function a Radio Resource Control Protocol Connection, RRC, of the mobile device, based on the request indicating a trigger for releasing the Radio Resource Control Protocol Connection, RRC, of the mobile device.

15. The apparatus of claim 14, wherein the recovery method, where the IP address of the mobile device is maintained comprises maintaining the mobile device attached or registered by the management function.

16. The apparatus of claim 15, wherein the information indicating the recovery of the mobile device comprises an updated IP address of the mobile device.

17. The apparatus of claim 11, wherein the apparatus is a management element or the management function in a core network of the communications network.

18. An apparatus comprising at least one processor; and at least one memory including computer program code, the at least one memory and computer program code configured to, with the at least one processor, cause the apparatus to perform:
receive by a mobile device, from a network a release or detach indication triggered based at least in part on a trigger message caused by at least one lost response by a server, wherein the release or detach indication comprises an information element that indicates a re-attach is required;
cause by the mobile device, a release or detach operation with the mobile communications network;
establish a connection with the network;
cause to receive, by the mobile device, a request from the server through the connection with the network; and
cause a reply to the request by the mobile device in the connection with the network to the server.

19. The apparatus of claim 18, wherein the mobile device comprises a monitoring application installed in the mobile device.

20. The apparatus of claim 18, wherein one or more lost responses determine a state of the mobile device.

* * * * *

UNITED STATES PATENT AND TRADEMARK OFFICE
CERTIFICATE OF CORRECTION

| | | |
|---|---|---|
| PATENT NO. | : 12,160,918 B2 | Page 1 of 1 |
| APPLICATION NO. | : 17/284619 | |
| DATED | : December 3, 2024 | |
| INVENTOR(S) | : Mika Maurits Aalto et al. | |

It is certified that error appears in the above-identified patent and that said Letters Patent is hereby corrected as shown below:

In the Claims

In Column 23 Line 3, Claim 10, delete "method" and insert -- apparatus --, therefor.

Signed and Sealed this
Twenty-fifth Day of February, 2025

Coke Morgan Stewart
*Acting Director of the United States Patent and Trademark Office*